US011568651B2

(12) United States Patent
Jiao

(10) Patent No.: US 11,568,651 B2
(45) Date of Patent: Jan. 31, 2023

(54) SYSTEM AND METHOD FOR LOCALIZATION OF TRAFFIC SIGNS

(71) Applicant: Pony AI Inc., Grand Cayman (KY)

(72) Inventor: Jialin Jiao, South San Francisco, CA (US)

(73) Assignee: Pony AI Inc., Grand Cayman (KY)

( * ) Notice: Subject to any disclaimer, the term of this patent is extended or adjusted under 35 U.S.C. 154(b) by 401 days.

(21) Appl. No.: 16/827,354

(22) Filed: Mar. 23, 2020

(65) Prior Publication Data
US 2021/0295067 A1  Sep. 23, 2021

(51) Int. Cl.
| | | |
|---|---|---|
| *G06K 9/00* | (2022.01) | |
| *B60W 30/14* | (2006.01) | |
| *G01C 21/32* | (2006.01) | |
| *G08G 1/0967* | (2006.01) | |
| *H04W 4/46* | (2018.01) | |
| *G06V 20/58* | (2022.01) | |

(52) U.S. Cl.
CPC ......... *G06V 20/582* (2022.01); *B60W 30/146* (2013.01); *G01C 21/32* (2013.01); *G08G 1/096725* (2013.01); *H04W 4/46* (2018.02); *B60W 2555/60* (2020.02)

(58) Field of Classification Search
CPC .............. G06V 20/582; B60W 30/146; B60W 2555/60; G01C 21/32; G01C 21/3822; G01C 21/3848; G08G 1/096725; G08G 1/0112; G08G 1/0141; G08G 1/096758; G08G 1/09623; G08G 1/09626; G08G 1/167
See application file for complete search history.

(56) References Cited

U.S. PATENT DOCUMENTS

| | | | |
|---|---|---|---|
| 9,090,246 B2 | 7/2015 | Cullen | |
| 9,261,376 B2 | 2/2016 | Cheng | |
| 10,203,699 B1 * | 2/2019 | Kim | G08G 1/096775 |
| 2013/0124083 A1 * | 5/2013 | Kratzsch | G01C 21/3602 |
| | | | 701/445 |
| 2014/0185880 A1 * | 7/2014 | Fairfield | G05D 1/0212 |
| | | | 382/104 |
| 2017/0103654 A1 | 4/2017 | Gaebler | |
| 2020/0124012 A1 * | 4/2020 | Lee | F02N 11/0837 |
| 2020/0184727 A1 * | 6/2020 | Ha | G01C 21/005 |
| 2020/0349833 A1 * | 11/2020 | Lerner | G08G 1/0125 |
| 2020/0409374 A1 * | 12/2020 | Dong | G07C 5/085 |
| 2021/0108926 A1 * | 4/2021 | Tran | G06N 3/04 |

* cited by examiner

*Primary Examiner* — Mussa A Shaawat
(74) *Attorney, Agent, or Firm* — Sheppard Mullin Richter & Hampton LLP

(57) ABSTRACT

Provided herein is a system and method of a vehicle. The system comprises one or more sensors, processors, maps, and a memory storing instructions that, when executed by the one or more processors, causes the system to perform: monitoring a location of the vehicle while driving; detecting a sign while the vehicle is driving; capturing, frame-by-frame, data of the sign until the sign disappears from a field of view of the sensor; synchronizing each frame of the data with the location of the vehicle; determining a location of the sign based on the frame-by-frame data; in response to determining, at a frame immediately before the sign disappears from the field of view of the sensor, that the vehicle is driving towards the sign, uploading the detected sign and the location of the sign onto the one or more maps; and implementing a driving action based on the sign.

20 Claims, 10 Drawing Sheets

SYSTEM AND METHOD FOR LOCALIZATION OF TRAFFIC SIGNS

TECHNICAL FIELD

The present disclosure relates generally to vehicles such as assisted-driving vehicles or autonomous vehicles (AVs), and in particular, some embodiments relate to such vehicles recognizing and localizing traffic signs.

BACKGROUND

A vehicle, such as an autonomous vehicle (AV), navigates using one or more maps such as a high definition (HD) map. The vehicle may supplement its maps with data from its sensors, which may include other vehicles, pedestrians, objects, and obstacles. Other features may be manually added to the maps. For instance, locations of traffic signs may be manually determined or determined using sensors external to the vehicle. Such a process is time-consuming and inaccurate. For example, some signs may be missed, which may result in unsafe driving behavior. This shortfall is addressed by the present disclosures, which provide recognition and localization of traffic signs on a map so that vehicles can navigate effectively while following the rules of the traffic signs. Additionally, using the features provided in the present disclosures, consumer confidence in reliability of such vehicles may also increase.

SUMMARY

Described herein are systems and methods for communicating an intended vehicle action. Various embodiments of the present disclosure provide a system comprising one or more sensors; one or more processors; one or more maps; and a memory storing instructions that, when executed by the one or more processors, causes the system to perform: monitoring a location of the vehicle while driving; detecting a sign, by a sensor of the one or more sensors, while the vehicle is driving; capturing, frame-by-frame, data of the sign until the sign disappears from a field of view of the sensor; synchronizing each frame of the data with the location of the vehicle; determining, at a frame immediately before the sign disappears from the field of view of the sensor, whether the vehicle is driving towards the sign; in response to determining that the vehicle is driving towards the sign at a frame immediately before the sign disappears, determining a location of the sign based on the captured frame-by-frame data; uploading the detected sign and the location of the sign onto the one or more maps; and implementing a driving action based on the sign.

In some embodiments, the determining a location of the sign comprises determining the location of the sign to correspond to the location of the vehicle immediately before the sign disappears from the field of view of the sensor.

In some embodiments, the detecting a sign comprises detecting a change in the sign; and the implementing a driving action comprises changing the driving action to conform to the change in the sign.

In some embodiments, the sign indicates a speed limit; the detecting a change in the sign comprises detecting a change in the speed limit to an updated speed limit; and the implementing a driving action comprises adjusting a speed of the vehicle based on a speed of another vehicle within a predetermined distance of the vehicle and adjusting the speed of the vehicle to be no more than the updated speed limit in response to the speed of the vehicle being higher than the updated speed limit.

In some embodiments, the determining, at a frame immediately before the sign disappears from the field of view of the sensor, whether the vehicle is driving towards the sign, comprises: determining a change in a position of the sign between each frame, with respect to the field of view of the sensor; determining whether a rate of the determined change in the position of the sign, with respect to a change of the location of the vehicle, is within a predetermined range, as the sign disappears from the field of view of the sensor.

In some embodiments, the position of the sign is a position of a center of the sign.

In some embodiments, the determining, at a frame immediately before the sign disappears from the field of view of the sensor, whether the vehicle is driving towards the sign, comprises: determining a trajectory of a change in a position of the sign between each frame, with respect to the field of view of the sensor, as the sign disappears from the field of view of the sensor; and determining whether the trajectory conforms to a predetermined trajectory.

In some embodiments, the instructions further cause the system to perform: inputting, from another vehicle, information of a location of a sign not on the one or more maps; and uploading the location of the sign onto the one or more maps.

In some embodiments, the instructions further cause the system to perform: determining whether the detected sign is damaged.

In some embodiments, the determining, at a frame immediately before the sign disappears from the field of view of the sensor, whether the vehicle is driving towards the sign comprises: determining, at a frame immediately before the sign disappears from the field of view of the sensor, whether an amount or a proportion of space occupied by the sign within the frame is within a predetermined range.

Various embodiments of the present disclosure provide a method implemented by a computing system including one or more processors and storage media storing machine-readable instructions, wherein the method is performed using the one or more processors. The method comprises: monitoring a location of the vehicle while driving; detecting a sign, by a sensor of the one or more sensors, while the vehicle is driving; capturing, frame-by-frame, data of the sign until the sign disappears from a field of view of the sensor; synchronizing each frame of the data with the location of the vehicle; determining, at a frame immediately before the sign disappears from the field of view of the sensor, whether the vehicle is driving towards the sign; in response to determining that the vehicle is driving towards the sign at a frame immediately before the sign disappears, determining a location of the sign based on the captured frame-by-frame data; uploading the detected sign and the location of the sign onto the one or more maps; and implementing, at the location of the sign, a driving action based on the sign.

In some embodiments, the determining a location of the sign comprises determining the location of the sign to correspond to the location of the vehicle immediately before the sign disappears from the field of view of the sensor.

In some embodiments, the detecting a sign comprises detecting a change in the sign; and the implementing a driving action comprises changing the driving action to conform to the change in the sign.

In some embodiments, the sign indicates a speed limit; the detecting a change in the sign comprises detecting a change in the speed limit to an updated speed limit; and the implementing a driving action comprises adjusting a speed of the vehicle based on a speed of another vehicle within a predetermined distance of the vehicle and adjusting the speed of the vehicle to be no more than the updated speed limit in response to the speed of the vehicle being higher than the updated speed limit.

In some embodiments, the determining, at a frame immediately before the sign disappears from the field of view of the sensor, whether the vehicle is driving towards the sign, comprises: determining a change in a position of the sign between each frame, with respect to the field of view of the sensor; determining whether a rate of the determined change in the position of the sign, with respect to a change of the location of the vehicle, is within a predetermined range, as the sign disappears from the field of view of the sensor.

In some embodiments, the position of the sign is a position of a center of the sign.

In some embodiments, the determining, at a frame immediately before the sign disappears from the field of view of the sensor, whether the vehicle is driving towards the sign, comprises: determining a trajectory of a change in a position of the sign between each frame, with respect to the field of view of the sensor, as the sign disappears from the field of view of the sensor; and determining whether the trajectory conforms to a predetermined trajectory.

In some embodiments, the method further comprises providing the location of the sign to another vehicle in order to upload the detected sign and the location of the sign onto one or more maps of the another vehicle.

In some embodiments, the method further comprises, inputting, from another vehicle, information of a location of another sign not on the one or more maps; and uploading the location of the sign onto the one or more maps.

In some embodiments, the method further comprises determining whether the detected sign is damaged.

In some embodiments, the determining, at a frame immediately before the sign disappears from the field of view of the sensor, whether the vehicle is driving towards the sign comprises: determining, at a frame immediately before the sign disappears from the field of view of the sensor, whether an amount or a proportion of space occupied by the sign within the frame is within a predetermined range.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Figure 1:
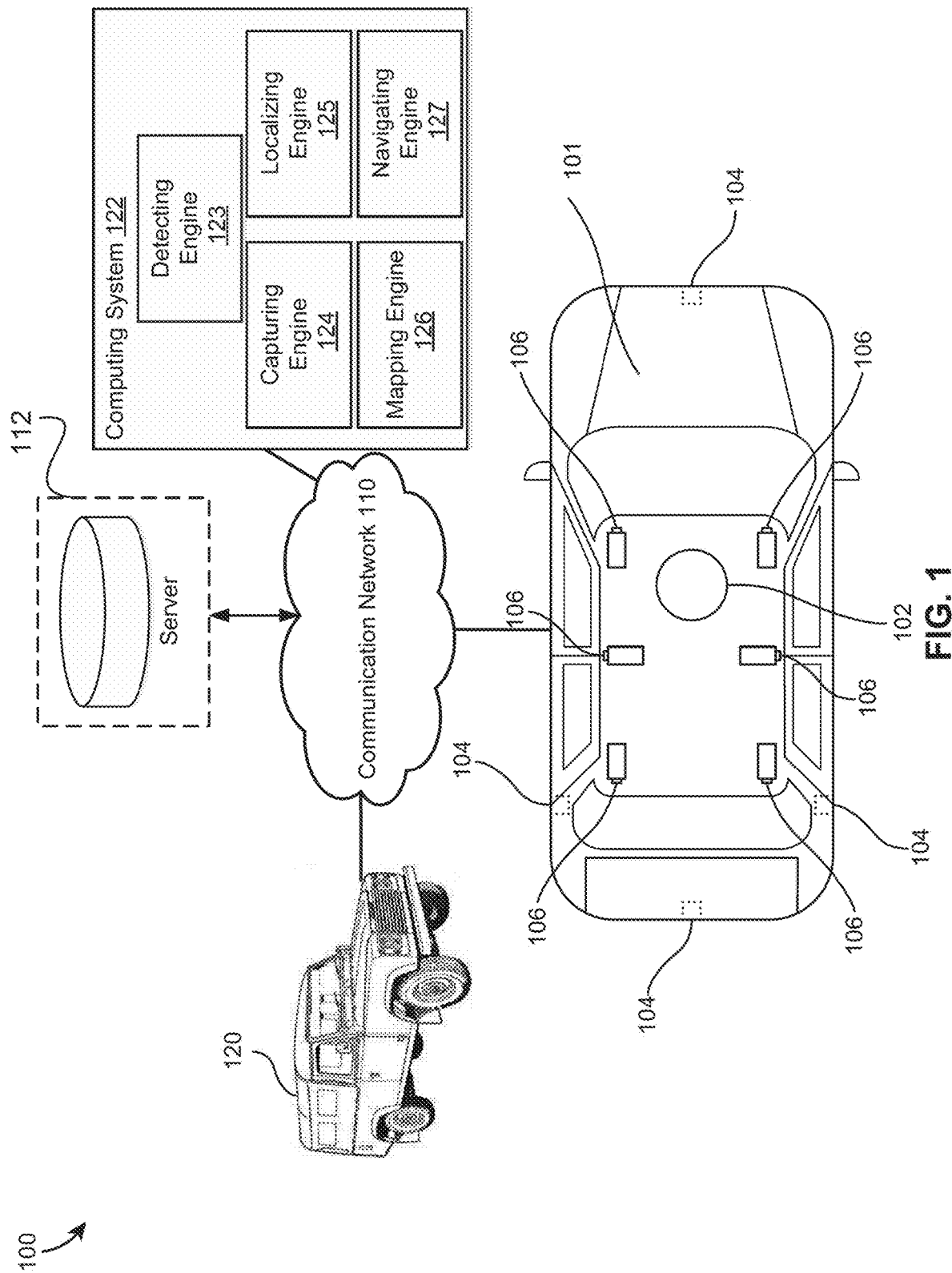
FIG. 1 illustrates an example environment of a system that detects a sign, captures frame-by-frame data of the sign, localizes the sign, and navigates based on the sign, according to an embodiment of the present disclosure.

FIG. 1 illustrates an example environment 100 of a system that detects a sign, captures frame-by-frame data of the sign, localizes the sign, and navigates based on the sign, according to an embodiment of the present disclosure. In FIG. 1, a vehicle such as an autonomous vehicle 101 may include myriad sensors (LiDAR sensors 102, radar sensors 104, cameras 106, GPS, sonar, ultrasonic, IMU (inertial measurement unit), accelerometers, gyroscopes, magnetometers, and FIR (far infrared) sensors) to detect and identify objects in the surrounding. The sensor data may comprise pictorial or image data (e.g., pictures, videos), audio data, audiovisual data, atmospheric data (e.g., temperature, pressure, elevation, and/or the like) captured in either real-time or with a time delay. For example, the LiDAR sensors 102 can generate a three-dimensional map of the environment. The LiDAR sensors 102 can also detect objects such as traffic signs in the environment. In another example, the radar systems 104 can determine distances and speeds of objects around the vehicle 101, and may be configured for adaptive cruise control and/or accident avoidance and blind spot detection. In another example, the cameras 106 can capture and process image data to detect and identify objects, such as road signs and traffic signs, as well as deciphering content of the objects, such as speed limit posted on the road signs. Such objects may include, but not limited to, pedestrians, road signs, traffic lights, and/or other vehicles, for example. In some embodiments, the cameras 106 can recognize, interpret, and analyze road signs (e.g., speed limit, school zone, construction zone, etc.) and traffic lights (e.g., red light, yellow light, green light, flashing red light, etc.). The vehicle 101 can also include myriad actuators to propel and navigate the vehicle 101 in the surrounding. Such actuators may include, for example, any suitable electro-mechanical devices or systems to control a throttle response, a braking action, a steering action, etc. In some embodiments, based on image data captured by the cameras 106, the vehicle 101 can adjust vehicle speed based on speed limit signs posted on roadways. For example, the vehicle 101 can maintain a constant, safe distance from a vehicle ahead (e.g., adaptive cruise control). In this example, the vehicle 101 maintains this safe distance by constantly adjusting its vehicle speed to that of the vehicle ahead.

In various embodiments, the vehicle 101 may navigate through roads, streets, and/or terrain with limited or no human input. The word "vehicle" or "vehicles" as used in this paper includes vehicles that travel on ground (e.g., cars, trucks, bus, etc.), but may also include vehicles that travel in air (e.g., drones, airplanes, helicopters, etc.), vehicles that travel on water (e.g., boats, submarines, etc.). Further, "vehicle" or "vehicles" discussed in this paper may or may not accommodate one or more passengers therein. Moreover, phrases "autonomous vehicles," "driverless vehicles," or any other vehicles that do not require active human involvement can be used interchangeably.

In general, the vehicle 101 can effectuate any control to itself that a human driver can on a conventional vehicle. For example, the vehicle 101 can accelerate, brake, turn left or right, or drive in a reverse direction just as a human driver can on the conventional vehicle. The vehicle 101 can also sense environmental conditions, gauge spatial relationships (e.g., distances between objects and itself), detect and analyze road signs just as the human driver. Moreover, the vehicle 101 can perform more complex operations, such as parallel parking, parking in a crowded parking lot, collision avoidance, etc., without any human input.

The vehicle 101 may be connected, via a communication network 110, to at least one computing system 122 that includes one or more processors and memory. The one or more processors may be configured to perform various operations by interpreting machine-readable instructions. In some embodiments, the example environment 100 may be implemented as a data platform. In some embodiments, the example environment 100 may be configured to interact with computing systems of the data platform. In various embodiments, one or more computing systems of the data platform may receive and process sensor data including data of road signs or traffic signs, localize the road signs or traffic signs on a map, navigate based on the road signs, which may involve perform the intended action such as speeding up, slowing down, or taking a detour.

In some embodiments, the computing system 122 may include detecting engine 123, capturing engine 124, localizing engine 125, mapping engine 126, and navigating engine 127. In general, the computing system 122 may be implemented, in whole or in part, with software that is capable of running on the computing system 122. In one example, the computing system 122 may be implemented as or within a software application running on one or more computing devices (e.g., user or client devices) and/or one or more servers (e.g., network servers or cloud servers, servers 112). In some instances, various aspects of the detecting engine 123, the capturing engine 124, the localizing engine 125, the mapping engine 126, and the navigating engine 127 may be implemented in one or more computing systems and/or devices. In some instances, one or more of the detecting engine 123, the capturing engine 124, the localizing engine 125, the mapping engine 126, and navigating engine 127 may be combined or integrated into a single processor, and some or all functions performed by one or more of the detecting engine 123, the capturing engine 124, the localizing engine 125, the mapping engine 126, and the navigating engine 127 may not be spatially separated, but instead may be performed by a common processor. The environment 100 may also include one or more servers 112 accessible to the computing system 122. The one or more servers 112 may store sensor data from the vehicle 101, one or more sensors of other vehicles such as another vehicle 120, which may be an AV, one or more satellite maps, and/or one or more road sensors such as sensors on traffic lights. In some embodiments, the one or more servers 112 may integrate data from different sensors. In other embodiments, the one or more servers 112 may keep the data from the different sensors separate. The one or more servers 112 may be accessible to the computing system 122 either directly or over the communication network 110. In some embodiments, the one or more servers 112 may store data that may be accessed by the detecting engine 123, the capturing engine 124, the localizing engine 125, the mapping engine 126, and the navigating engine 127 to provide the various features described herein. In some embodiments, the one or more servers 112 may store data that may be accessed by the another vehicle 120. As an example, data from the detecting engine 123 may be stored in the one or more servers 112 and accessed by the another vehicle 120. The another vehicle 120 may also acquire data from the vehicle 101, either directly in an ad-hoc network, or through the one or more servers 112. In some instances, the one or more servers 112 may include federated data stores, databases, or any other type of data source from which data may be stored and retrieved, for example. In some implementations, the one or more servers 112 may include various types of data sets on which determinations of accuracy or consistency with other information can be made. In general, a user operating a computing device can interact with the computing system 122 over the communication network 110, for example, through one or more graphical user interfaces and/or application programming interfaces.

The detecting engine 123 may be configured to control operations of or relating to the sensors such as the LiDAR sensors 102, radar systems 104 and cameras 106, and process data acquired by the sensors. The detecting engine 123 may be configured to process data acquired from the sensors such as the LiDAR sensors 102, radar systems 104 and cameras 106, and detect a signal from a source (e.g., another vehicle such as the another vehicle 120, a pedestrian, or a road sign). In some embodiments, the detecting engine 123 may, using a sensor of the sensors, detect a road sign such as a speed limit sign, a stop sign, a deer crossing sign, an emergency vehicle warning sign, a keep right sign, a men at work sign, a no bicycle sign, a no U-turn sign, a pedestrian crossing sign, a yield sign, a hump sign, a minimum seed sign, a slippery road sign, an uneven road sign, or a merge sign. In some embodiments, the detecting engine 123 may recognize a road sign and recognize a type of the road sign. In some examples, a pretrained model of YoloV3 network architecture may be used to detect a road sign. The detecting engine 123 may recognize a road sign via region segmentation, edge tracing, geometrical analysis of an outer edge and recognition of each candidate region that may potentially be a road sign, and model matching. The region segmentation may be utilized to detect regions that may potentially be road signs. The detection of regions may be based on color pixel classification, such as a Supervised Region Segmentation Method (SRSM). The detection of regions may comprise creating subspaces in a RGB (red-green-blue) space that include most of the variations of colors in road signs. The subspaces may be approximated by conical sections in the RGB space. The detection of regions may comprise recognition road signs under different illumination conditions, and detecting whether the road signs have been damaged, for example, due to weathering which would alter an original color of the road signs, based on detecting possible changes in one or more colors of the road signs. During the detection of regions, portions of the regions unlikely to belong to a road sign, using a geometrical analysis of contours, may be removed. Meanwhile, the edge tracing process may comprise recognizing that an outer edge of regions may belong to a known shape of a road sign, such as a circular shape or a shape consisting of sections of straight lines as a triangle, rectangle, or octagon, and recognizing a particular length ratio or angle between sides. After the edge tracing process, the geometrical analysis process may be employed to recreate a shape of the potential road sign and to detect a potential type of the road sign based on the recreated shape and detected color combinations inside the region. The geometrical analysis process may comprise cropping the recreated shape into a bounding box and classifying the sign inside the recreated shape into a predefined class of signs, such as a speed limit sign. The classification may be based on a ResNet model. The model matching process may comprise computing pixel count ratios for each color within the regions of potential road signs.

In some embodiments, the detecting engine 123 may further detect a signal such as a flashing light, a flashing row of lights, a blinking light, or a blinking row of lights on a side of the source facing the vehicle 101. The flashing or blinking light or the flashing or blinking row of lights may indicate that the source intends to overtake the vehicle 101 and to switch into a lane occupied by the vehicle 101, at a position in front of the vehicle 101. The detecting engine 123, in some embodiments, may be configured to determine a relative position of the source with respect to the vehicle 101. For example, the detecting engine 123 may be configured to determine whether the vehicle 101 is completely in front of or completely behind the source, with respect to a travelling or driving direction of the vehicle 101. If the source is not completely in front of or completely behind the vehicle 101 (for example, if a back portion of the vehicle 101 is aligned with a front portion of a source, and the vehicle 101 and the source), the detecting engine 123 may detect a lateral movement of the source even if the source does not signal. The lateral movement may be a movement from a lane occupied by the source towards a lane occupied by the vehicle 101, in a direction perpendicular to the driving direction of the vehicle 101. In some examples, the detecting engine 123 may detect whether a distance of a lateral movement, or how much the source has decreased its lateral distance from the vehicle 101, is above a threshold. In such a manner, the detecting engine 123 may be configured to detect whether a source (e.g., the another vehicle 120) is intending to overtake the vehicle 101 and to make a lane change, even when the source does not provide a signal, which may occur when the source has broken signals (e.g., lights not working). In some embodiments, the detecting engine 123 may only detect a lateral movement of a source if the source is not completely in front of or behind the vehicle 101, or if the source is within a field of view of the vehicle 101. In some embodiments, the detecting engine 123 may further be configured to detect pedestrians or people, for example, crossing a street. The detecting engine 123 may further be configured to recognize walking movements of pedestrians or people, and to recognize hand gestures or hand signals from pedestrians such as an upraised hand to indicate that the pedestrian is intending to cross a street. The detecting engine 123 may further be configured to detect and distinguish bicycles and motorcycles from other vehicles. The detecting engine 123 may be configured to control operations of or relating to the sensors such as the LiDAR sensors 102, radar systems 104 and cameras 106, and process data acquired by the sensors. The detecting engine 123 may capture a field of view including one or more vehicles within a vicinity of the vehicle 101. The detecting engine 123 may capture data from one or more sensors of another vehicle nearby, or closest to, a current position of the vehicle 101 and/or one or more vehicles within a predetermined distance of the vehicle 101. The detecting engine 123 may capture data of an obstacle such as a pothole, bump, skidding or slippery surface, chemical hazard, animal, or other irregularity on a road.

In some embodiments, after detecting the road sign by the detecting engine 123, the capturing engine 124 may capture, frame-by-frame, data of the road sign while the vehicle 101 is driving until the road sign disappears from a field of view of the sensor, and synchronize each frame of the data with the location of the vehicle. In some embodiments, the capturing engine 124 may simultaneously determine a corresponding position or location of the vehicle 101 at a time of capture of each frame. In some embodiments, the capturing engine 124 may capture words, indications, or instructions within the road sign. In some embodiments, the capturing engine 124 my detect a speed limit indicated by the road sign at each frame. In some embodiments, the capturing engine 124 may detect a change in the road sign, such as a change in a speed limit to an updated speed limit. For example, the capturing engine 124 may detect that an indicated speed limit changes from 55 mph to 45 mph. The capturing engine 124 may further determine, at a frame immediately before the road sign disappears from the field of view of the sensor, whether a space occupied by the road sign within the frame is within a predetermined range. For example, if the road sign occupies only a small portion of the frame immediately before the road sign disappears from the field of view of the sensor, the capturing engine 124 may determine that the road sign is still distant from the vehicle 101, which may occur if the vehicle 101 has previously detected the road sign at a remote distance but is now turning in a direction away from a road where the road sign is located. Another method of determining whether the road sign is still distant from the vehicle 101 when the road sign disappears from a field of view of the sensor includes, determining a change in a position of the road sign between each frame, with respect to the field of view of the sensor, and determining whether a rate of the determined change in the position of the road sign, with respect to a change of the location of the vehicle, is within a predetermined range, as the road sign disappears from the field of view of the sensor. For example, for each predetermined distance, such as one meter, that the vehicle 101 travels, if the road sign moves quickly out of the field of view of the sensor, the capturing engine 124 may determine that the vehicle 101 is not actually moving toward the sensor but to a side, either to a left or right, of the road sign. Another method of determining whether the road sign is still distant from the vehicle 101 when the road sign disappears from a field of view of the sensor includes, determining a trajectory of a change in a position of the road sign between each frame, with respect to the field of view of the sensor, as the road sign disappears from the field of view of the sensor, determining whether the trajectory conforms to a predetermined trajectory. For example, the capturing engine 124 may determine that typically, a road sign moves upward within the field of view of the sensor as the vehicle 101 is driving towards the sensor. However, if the road sign does not move upward within the field of view of the sensor after successive captured frames, the vehicle 101 may be moving to a side, either to a right or left, of the road sign, rather than towards the road sign.

In response to the capturing engine 124 capturing or detecting multiple frames of data of the road sign, and determining that the vehicle 101 is moving towards the road sign when, or immediately before, the road sign disappears from a field of view of the sensor, the localizing engine 125 may determine a location of the road sign based on the multiple frames of data. In some embodiments, the localizing engine 125 may determine the location of the road sign to correspond to the location of the vehicle 101 at an instance when, or immediately before, the road sign disappears from the field of view of the sensor. In some embodiments, the mapping engine 126 may upload the detected road sign and the determined location of the road sign onto one or more maps of the vehicle 101. In some examples, the one or more maps of the vehicle 101 may include a high definition (HD) map or a satellite map. In some embodiments, the mapping engine 126 may send the information of the detected road sign and the location of the road sign to a map of another vehicle. In some embodiments, the mapping engine 126 may capture information of a road sign and a location of the road sign from another vehicle and upload the information onto the one or more maps of the vehicle 101. In some embodiments, the navigating engine 127 may be configured to perform a driving action on the vehicle 101. The navigating engine 127 may be configured to change the driving action to conform to a change in the sign, for example, adjusting a speed of the vehicle based on a speed of another vehicle within a predetermined distance of the vehicle and adjusting the speed of the vehicle to be no more than the updated speed limit in response to the speed of the vehicle being higher than the updated speed limit.

Figure 2:
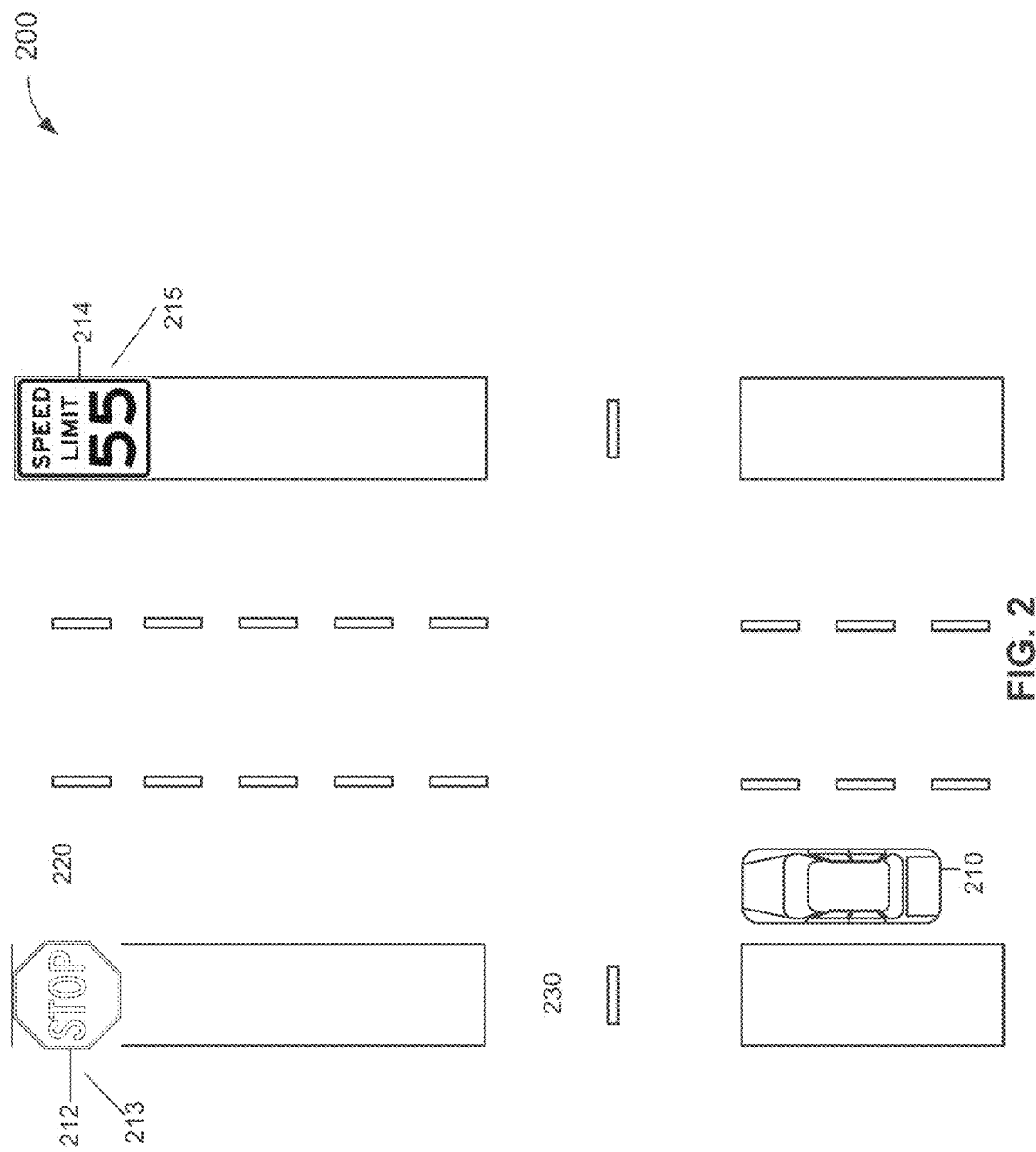
FIG. 2 illustrates an environment in which embodiments of the present disclosure may be implemented.

FIG. 2 illustrates an environment 200 in which embodiments of the present disclosure may be implemented. In FIG. 2, any reference to a vehicle performing a determination or taking an action may be understood to mean that one or more processors of the vehicle may perform the determination or take the action. In FIG. 2, a vehicle 210, which may be implemented as the vehicle 101, may be driving on a lane 220. A stop sign 212 may be located at a location 213 and a speed limit sign 214 may be located at a location 215. A lane 230 may be a cross street and perpendicular to the lane 220. As the vehicle 210 is driving, the detecting engine 123 may detect the stop sign 212 and the speed limit sign 214. After detection of the stop sign 212 and the speed limit sign 214, the capturing engine 124 may continuously capture frames of the stop sign 212 and the speed limit sign 214 as the vehicle 210 is driving. For example, the capturing engine 124 may capture each frame at a predetermined time interval or after the vehicle 210 has travelled a predetermined distance. For example, the capturing engine 124 may capture a frame after every second or 0.5 seconds. In other embodiments, the capturing engine 124 may capture a frame after every 100 meters or 50 meters the vehicle 210 has travelled.

Figure 3:
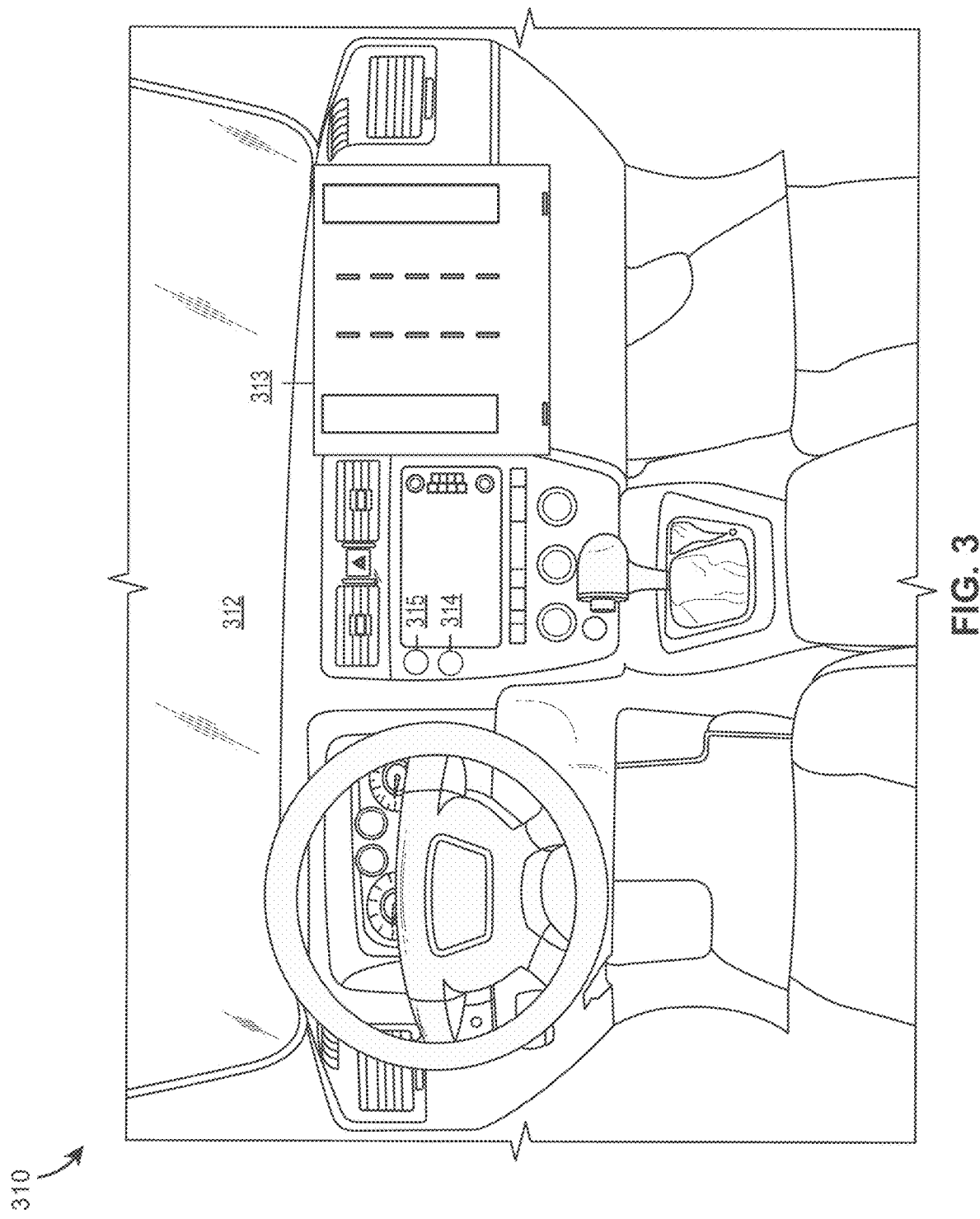
FIGS. 3, 4A, 4B, 5A, 5B, and 6 illustrate exemplary implementations of the system, according to embodiments of the present disclosure.

FIG. 3 illustrates an exemplary implementation of the system, according to embodiments of the present disclosure. In FIG. 3, a vehicle 310, which may be implemented as the vehicle 210 or the vehicle 101, may comprise an interior 312 of the vehicle 310, a map 313 within the interior 312 of the vehicle 310, a speaker 314 that outputs verbal commands, and a microphone 315 that detects commands from a person inside the vehicle 310 or from another vehicle within a predetermined distance of the vehicle 310. In some embodiments, the map 313 may be a high definition (HD) map that illustrates nearby surroundings of the vehicle 310, and/or intended navigation actions of the vehicle 310. For example, the map 313 may display the environment 200 that is in front of the vehicle 310. Data of the stop sign 212 and the speed limit sign 214 may not be present in the map 313 because it has not yet been identified and/or recorded in the map 313.

FIGS. 4A, 4B, 5A, 5B, and 6 illustrate exemplary implementations of the system, according to embodiments of the present disclosure, in which data of the stop sign, such as the stop sign 212, and data of the speed limit sign, such as the speed limit sign 214, is inputted or added to a map, such as the map 313, of the vehicle 310. The steps illustrated in FIGS. 4A, 4B, 5A, 5B, and 6 may be performed by one or more of the detecting engine 123, the capturing engine 124, the localizing engine 125, and/or the mapping engine 126.

Figure 4A:
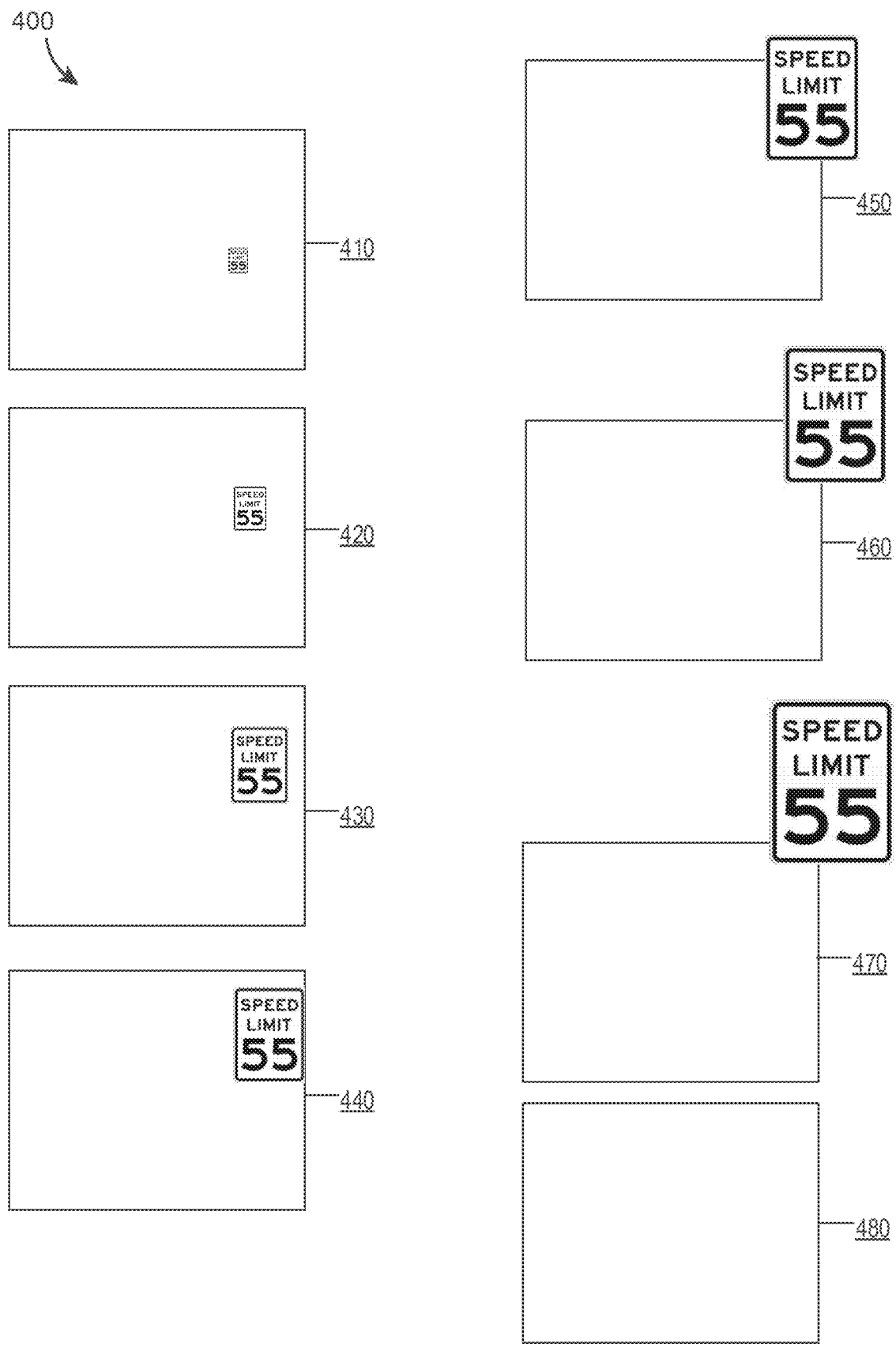

FIG. 4A illustrates the capturing of frame-by-frame data of a speed limit sign as a vehicle such as the vehicle 310 is driving towards the speed limit sign. In FIG. 4A, an existence of a speed limit sign, such as the speed limit sign 214, may be detected in, or prior to, frame 410, by the detecting engine 123. The capturing engine 124 may be configured to capture multiple frames 420, 430, 440, 450, 460, 470, and 480 of the speed limit sign 214. The capturing engine 124 may capture a frame after a predetermined distance, such as every 100 meters or 50 meters, that the vehicle 310 has travelled. Thus, for example, the frame 420 may be captured after the vehicle 310 has travelled 100 meters from its location when the frame 410 was captured, and the frame 430 may be captured after the vehicle 310 has travelled 100 meters from its location when the frame 420 was captured. In some embodiments, the capturing engine 124 may capture every frame at a predetermined time interval. In some embodiments, the capturing engine 124 or other processor may only select, from the captured frames at predetermined time intervals, frames for which the vehicle has travelled equal to or more than a predetermined distance. For example, if the predetermined distance is 100 meters, and if the vehicle 310 has only travelled 50 meters between two captured frames, the capturing engine 124 may disregard or discard the later frame. If the vehicle 310 has travelled 100 meters or more between two captured frames, the capturing engine 124 would select both frames. If the vehicle 310 has travelled 50 meters between a first two captured frames and 100 meters between the first captured frame and a third captured frame, meaning that the distance between the second captured frame and the third captured frame is 50 meters, the capturing engine 124 may select only the first frame and the third frame while disregarding the second frame.

Each of the frames 410, 420, 430, 440, 450, 460, 470, and 480 may have a field of view corresponding to, or equivalent to, a field of view of a sensor that is actually capturing sensor data for navigation, such as a camera, LiDar, radar, or IMU, while the vehicle 310 is driving. In each of the frames 410, 420, 430, 440, 450, 460, 470, and 480, sensor data captured by the sensor other than the speed limit sign 214 may be removed. A relative size and position of the speed limit sign 214 within the field of view of the sensor may be shown in each of the frames 410, 420, 430, 440, 450, 460, 470, and 480, as captured by the sensor. For example, as the vehicle 310 gets closer to the speed limit sign 214, a relative size of the speed limit sign 214 may increase because the speed limit sign 214 may consume more space or area, or a proportion of the space, of the field of view of the sensor. Between the frame 410 and the frame 470, the relative size of the speed limit sign 214 increases relative to the field of view. In frame 480, the speed limit sign 214 is no longer seen within the field of view of the sensor. The capturing engine 124 may be configured to determine whether the vehicle 310 is travelling towards the speed limit sign 214, while the frames 410 through 470 are being captured. In some embodiments, the capturing engine 214 may determine whether the vehicle 310 is travelling towards the speed limit sign 214 by determining whether the size of the speed limit sign 214 is increasing relative to the field of view, whether a rate of the increase is greater than a predetermined threshold rate of increase, and/or based on the size of the speed limit sign relative to the field of view at the frame 470, before the speed limit sign 214 completely disappears from the field of view. For example, the size of the speed limit sign 214 relative to the field of view, or a space or proportion of space taken up by the speed limit sign 214 with respect to an entire field of view, may be compared with a threshold size, space, or proportion of space, to determine whether the size is within a predetermined tolerance of the threshold size. The threshold size may be a known size of the speed limit sign 214 with respect to an entire field of view of the sensor, when the vehicle 310 is at the location (e.g., the location 215) of the speed limit sign 214. The threshold size may be determined based on a type of the sensor and a type of the road sign. If the size is within the predetermined tolerance of the threshold size, the capturing engine 124 may determine that the vehicle 310 is travelling towards the speed limit sign 214, and is at the location of the speed limit sign 214 when the speed limit sign 214 disappears from the field of view. For example, the vehicle 310 may be determined to be continuing onto the lane 220.

In some embodiments, if the capturing engine 124 determines the vehicle 310 is travelling towards the speed limit sign 214, the localizing engine 125 may determine the location of the speed limit sign 214 corresponds to a location of the vehicle 310 during the frame 440, which is the frame immediately before the speed limit sign 214 begins to disappear from the field of view. In some embodiments, the localizing engine 125 may determine the location of the speed limit sign 214 corresponds to a location of the vehicle 310 during the frame 450, which is the frame immediately after the speed limit sign 214 begins to disappear from the field of view. In some embodiments, the localizing engine 125 may determine the location of the speed limit sign 214 corresponds to a location of the vehicle 310 during the frame 470, which is the frame immediately before the speed limit sign 214 completely disappears from the field of view. In some embodiments, the localizing engine 125 may determine the location of the speed limit sign 214 corresponds to a location of the vehicle 310 during the frame 480, which is the frame immediately after, or when, the speed limit sign 214 completely disappears from the field of view.

Figure 4B:
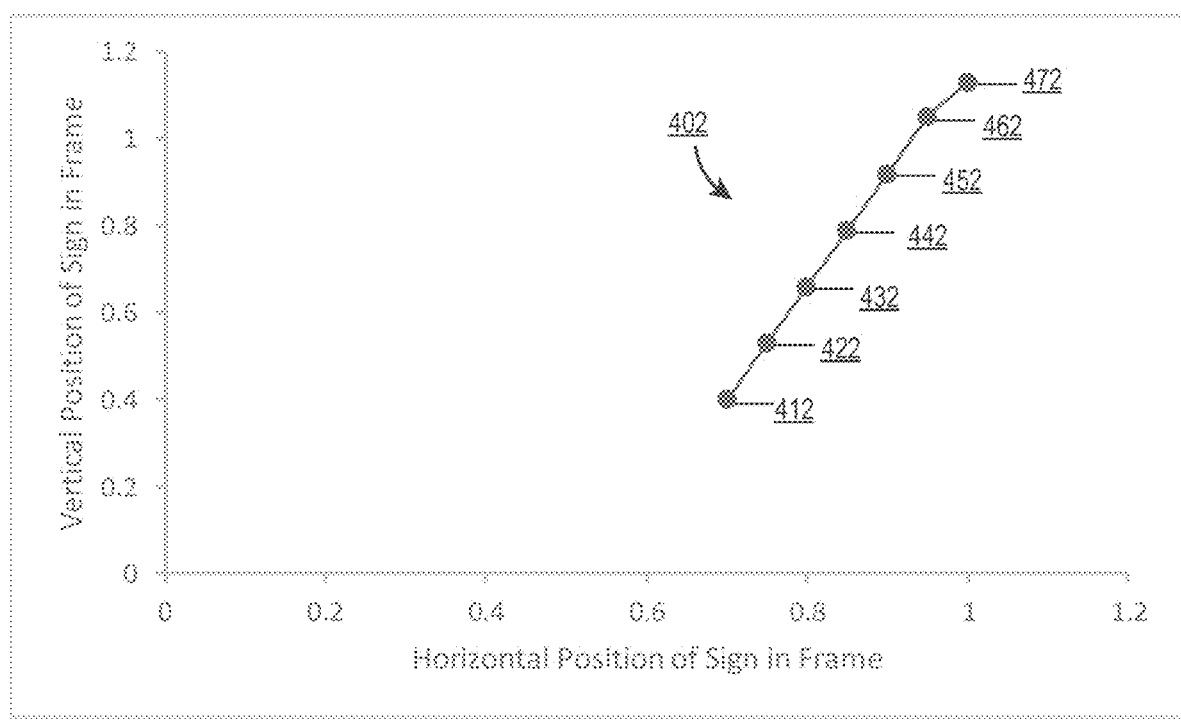

In FIG. 4B, the capturing engine 124 may determine a trajectory 402 that illustrates a change, between each of the frames 410-480, in a relative position of the speed limit sign 214 within the field of view as the vehicle 310 is driving. For example, the vertical position of the speed limit sign 214 in a frame represents a relative location of a center of the speed limit sign 214 between a lowermost portion and an uppermost portion of the field of view. In particular, "0" may represent a bottom of the field of view and "1" may represent a top of the field of view, and 0.5 may indicate that the speed limit sign 214 is located halfway between the bottom and the top. Similarly, the horizonal position of the speed limit sign 214 in a frame represents a relative location of a center of the speed limit sign 214 between a left edge (leftmost portion) and a right edge (rightmost portion) of the field of view. The trajectory 402 may include points 412, 422, 432, 442, 452, 462, and 472, which correspond to relative positions of the speed limit sign 214 in the frames 410, 420, 430, 440, 450, 460, and 470, respectively.

The capturing engine 124 may determine whether the vehicle 310 is travelling towards the speed limit sign 214, using the trajectory 402. In particular, the trajectory 402 should display a relatively linear increase in the relative position of the speed limit sign 214 within the field of view, if the vehicle is indeed travelling towards the speed limit sign 214. The capturing engine 124 may determine whether a relative increase in the horizontal position and/or the vertical position between each point is within a tolerance of a threshold increase. The capturing engine 124 may, additionally or alternatively, determine whether the trajectory 402 conforms with a predetermined trajectory, within a tolerance. The capturing engine 124 may determine whether a $R^2$ value of the trajectory is within a tolerance of a threshold $R^2$ value.

Figure 5A:
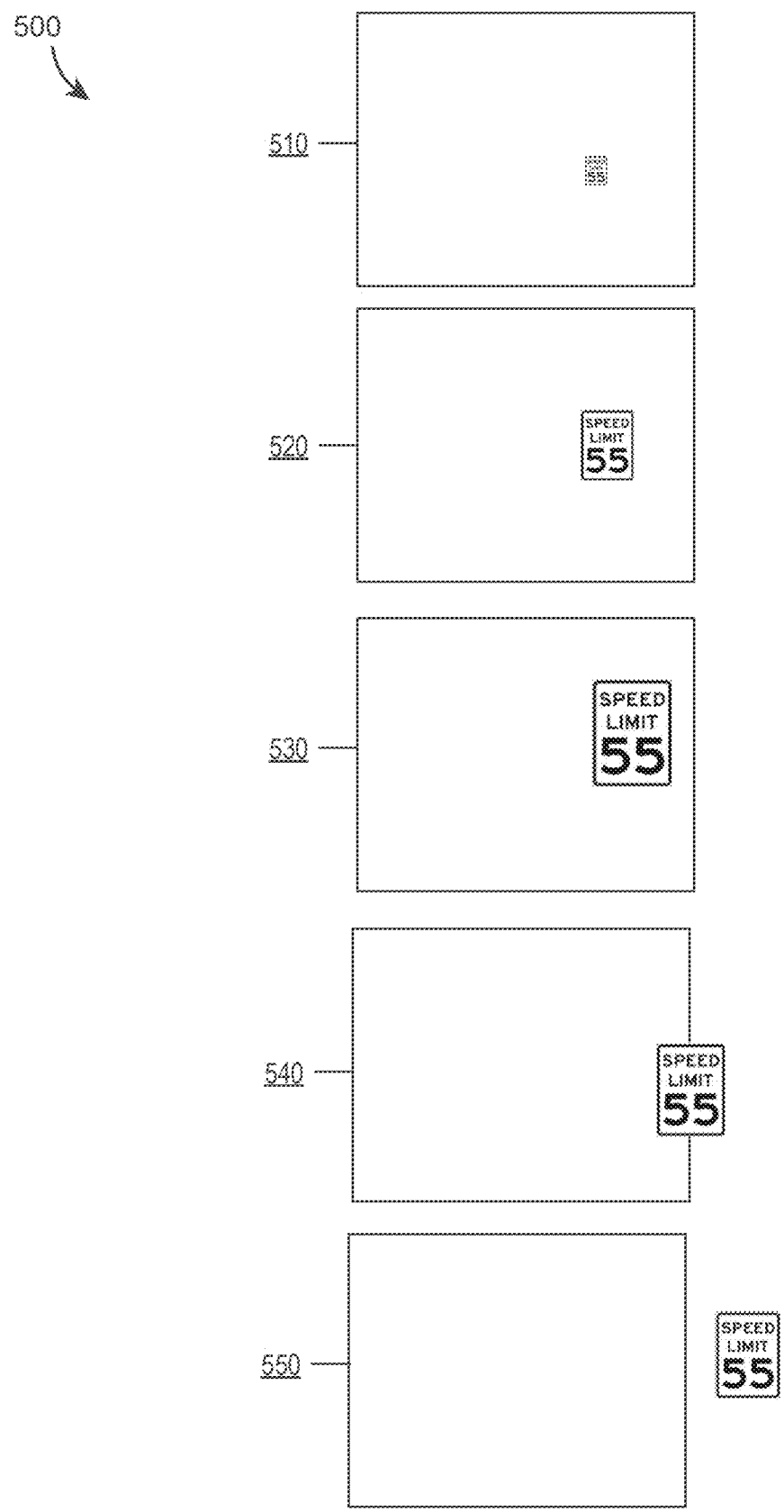

FIG. 5A illustrates the capturing of frame-by-frame data of a speed limit sign as a vehicle such as the vehicle 310 is driving in a direction away from, or turning to a road away from, the speed limit sign. For example, the vehicle 310 may be turning onto the lane 230 instead of driving straight on the lane 220. In FIG. 5A, an existence of a speed limit sign, such as the speed limit sign 214, may be detected in, or prior to, frame 510, by the detecting engine 123. The capturing engine 124 may be configured to capture multiple frames 520, 530, 540, and 550 of the speed limit sign 214. The capturing engine 124 may capture a frame after a predetermined distance, such as every 100 meters or 50 meters, that the vehicle 310 has travelled. Thus, for example, the frame 520 may be captured after the vehicle 310 has travelled 100 meters from its location when the frame 510 was captured, and the frame 530 may be captured after the vehicle 310 has travelled 100 meters from its location when the frame 520 was captured. In some embodiments, the capturing engine 124 may capture every frame at a predetermined time interval. In some embodiments, the capturing engine 124 or other processor may only select, from the captured frames at predetermined time intervals, frames for which the vehicle has travelled equal to or more than a predetermined distance. For example, if the predetermined distance is 100 meters, and if the vehicle 310 has only travelled 50 meters between two captured frames, the capturing engine 124 may disregard or discard the later frame. If the vehicle 310 has travelled 100 meters or more between two captured frames, the capturing engine 124 would select both frames. If the vehicle 310 has travelled 50 meters between a first two captured frames and 100 meters between the first captured frame and a third captured frame, meaning that the distance between the second captured frame and the third captured frame is 50 meters, the capturing engine 124 may select only the first frame and the third frame while disregarding the second frame.

Each of the frames 510, 520, 530, 540, and 550 may have a field of view corresponding to, or equivalent to, a field of view of a sensor that is actually capturing sensor data for navigation, such as a camera, LiDar, radar, or IMU, while the vehicle 310 is driving. In each of the frames 510, 520, 530, 540, and 550, sensor data captured by the sensor other than the speed limit sign 214 may be removed. A relative size and position of the speed limit sign 214 within the field of view of the sensor may be shown in each of the frames 510, 520, 530, 540, and 550 as captured by the sensor. For example, if the vehicle 310 is travelling towards and approaching closer to the speed limit sign 214, a relative size of the speed limit sign 214 may increase because the speed limit sign 214 may consume more space or area, or a proportion of the space, of the field of view of the sensor. If the vehicle 310 is travelling away from, or orthogonally to a road having the speed limit sign 214, then the relative size of the speed limit sign 214 may not increase, but instead, stay the same or decrease.

Between the frame 510 and the frame 530, the relative size of the speed limit sign 214 increases relative to the field of view. However, between the frame 530 and the frame 550, the relative size of the speed limit sign 214 decreases relative to the field of view, indicating that the vehicle 310 is not driving towards the speed limit sign 214 between the frame 530 and the frame 550. In frame 550, the speed limit sign 214 is no longer seen within the field of view of the sensor. The capturing engine 124 may be configured to determine whether the vehicle 310 is travelling towards the speed limit sign 214, while the frames 510 through 550 are being captured. In some embodiments, the capturing engine 214 may determine whether the vehicle 310 is travelling towards the speed limit sign 214 by determining whether the size of the speed limit sign 214 is increasing relative to the field of view, whether a rate of the increase is greater than a predetermined threshold rate of increase, and/or based on the size of the speed limit sign relative to the field of view at the frame 540, before the speed limit sign 214 completely disappears from the field of view. For example, the size of the speed limit sign 214 relative to the field of view, or a space or proportion of space taken up by the speed limit sign 214 with respect to an entire field of view, may be compared with a threshold size, space, or proportion of space, to determine whether the size is within a predetermined tolerance of the threshold size. The threshold size may be a known size of the speed limit sign 214 with respect to an entire field of view of the sensor, when the vehicle 310 is at the location (e.g., the location 215) of the speed limit sign 214. The threshold size may be determined based on a type of the sensor and a type of the road sign. If the size is within the predetermined tolerance of the threshold size, the capturing engine 124 may determine that the vehicle 310 is travelling towards the speed limit sign 214, and is at the location of the speed limit sign 214 when the speed limit sign 214 disappears from the field of view. Here, in FIG. 5A, the capturing engine 124 may determine that the vehicle 310 is not travelling towards the speed limit sign 214 because the relative size of the speed limit sign is not increasing when the speed limit sign 214 disappears from the field of view. The localization engine 125 may disregard a location of the speed limit sign 214 as the speed limit sign 214 disappears from the field of view. The mapping engine 126 may not input any location of the speed limit sign 214 to the map.

Figure 5B:
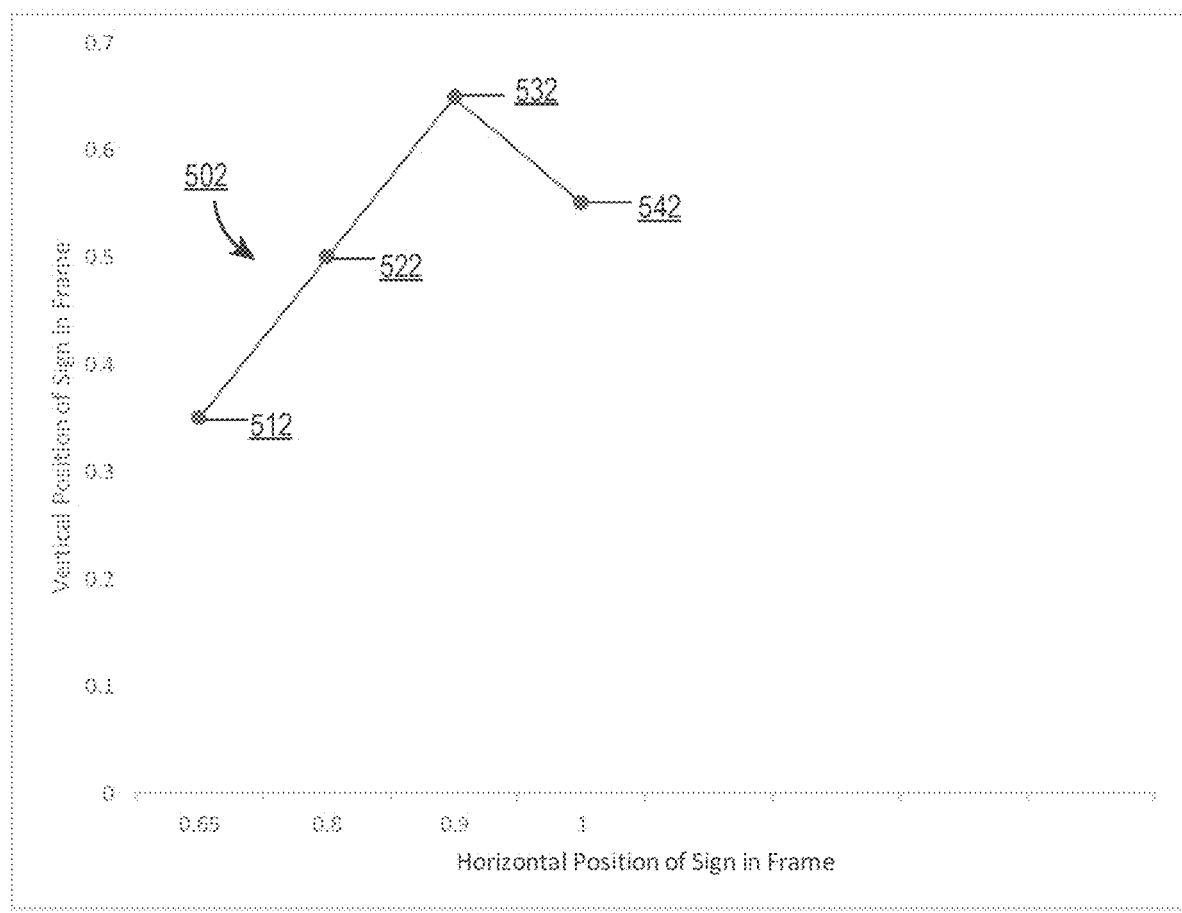

In FIG. 5B, the capturing engine 124 may determine a trajectory 502 that illustrates a change, between each of the frames 510-540, in a relative position of the speed limit sign 214 within the field of view as the vehicle 310 is driving. For example, the vertical position of the speed limit sign 214 in a frame represents a relative location of a center of the speed limit sign 214 between a lowermost portion and an uppermost portion of the field of view. In particular, "0" may represent a bottom of the field of view and "1" may represent a top of the field of view, and 0.5 may indicate that the speed limit sign 214 is located halfway between the bottom and the top. Similarly, the horizonal position of the speed limit sign 214 in a frame represents a relative location of a center of the speed limit sign 214 between a left edge (leftmost portion) and a right edge (rightmost portion) of the field of view. The trajectory 502 may include points 512, 522, 532, and 542, which correspond to relative positions of the speed limit sign 214 in the frames 510, 520, 530, and 540, respectively.

The capturing engine 124 may determine whether the vehicle 310 is travelling towards the speed limit sign 214, using the trajectory 502. In particular, the trajectory 502 should display a relatively linear increase in the relative position of the speed limit sign 214 within the field of view, if the vehicle is indeed travelling towards the speed limit sign 214. The capturing engine 124 may determine whether a relative increase in the horizontal position and/or the vertical position between each point is within a tolerance of a threshold increase. The capturing engine 124 may, additionally or alternatively, determine whether the trajectory 502 conforms with a predetermined trajectory, within a tolerance. The capturing engine 124 may determine whether a $R^2$ value of the trajectory is within a tolerance of a threshold $R^2$ value. Here, the capturing engine 124 may determine that the vehicle 310 is not travelling towards the speed limit sign 214 because the trajectory 502 shows a decrease between the points 532 and 542.

Figure 6:
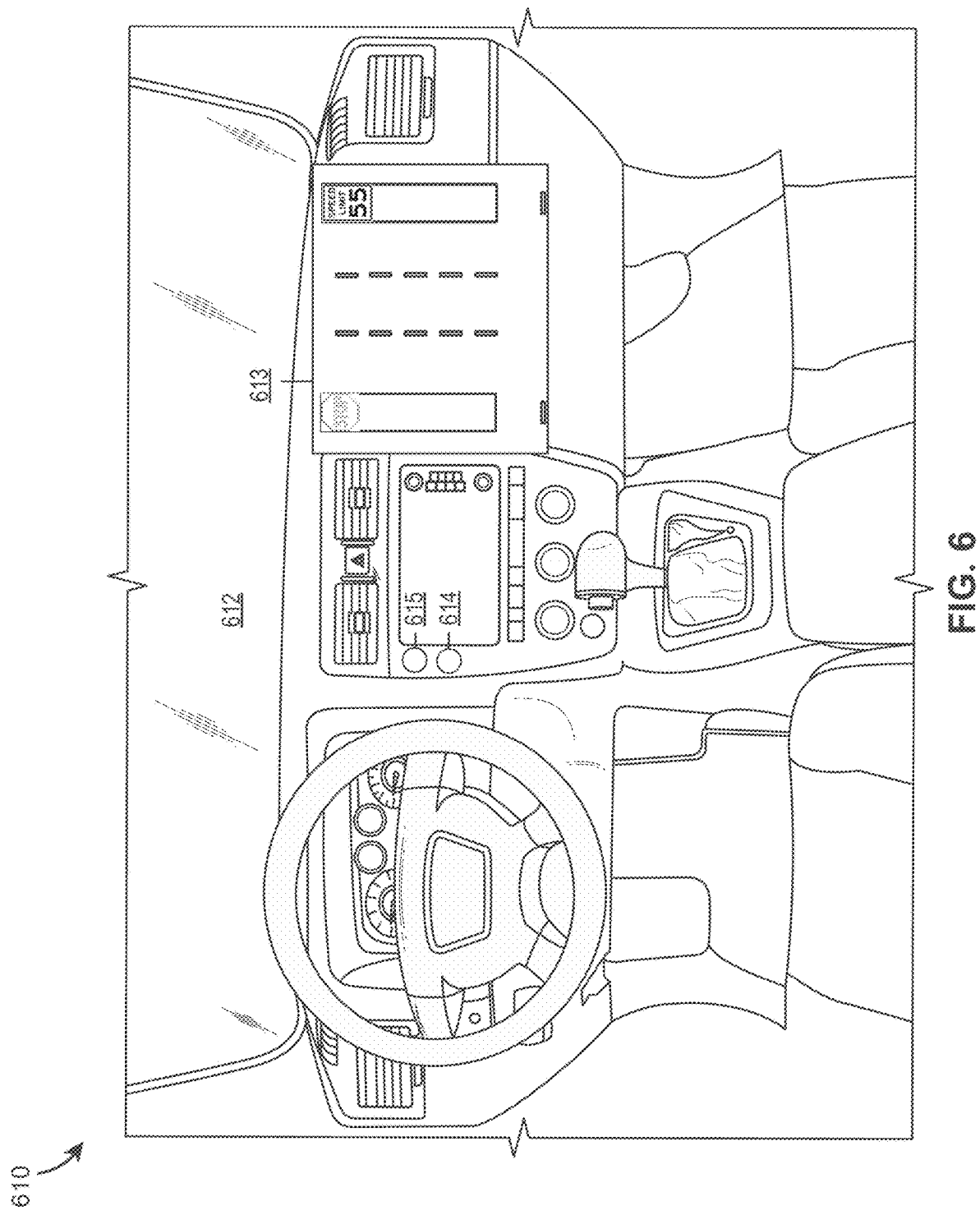

In FIG. 6, a location of the speed limit sign 214 may be inputted into a map 613 in response to the steps performed in FIGS. 4A and/or 4B. Additionally, a location of the stop sign 212 may be inputted into the map 613 in a similar manner. In FIG. 6, a vehicle 610, which may be implemented as the vehicle 310, 210 or 101, may comprise an interior 612 of the vehicle 610, the map 613 within the interior 612 of the vehicle 610, a speaker 614 that outputs verbal commands, and a microphone 615 that detects commands from a person inside the vehicle 610 or from another vehicle within a predetermined distance of the vehicle 610. In some embodiments, the map 613 may be a high definition (HD) map that illustrates nearby surroundings of the vehicle 610, and/or intended navigation actions of the vehicle 610. For example, the map 613 may display the environment, such as the environment 200, that is in front of the vehicle 610. Data of the stop sign 212 and the speed limit sign 214 may be inputted or added to the map 613 after detection, capturing, and localization of the stop sign 212 and the speed limit sign 214.

After the data of the stop sign 212 and the speed limit sign 214 is inputting to the map 613, the vehicle 610 may implement one or more driving actions based on the stop sign 212 and the speed limit sign 214, using the navigating engine 127, for example. For example, the vehicle 610 may adjust its speed to comply with the speed limit sign 214, right at the location of or right before the speed limit sign 214. If the speed limit sign 214 has a dynamically changing speed limit, the vehicle 610 may continuously monitor for changes in the speed limit and comply with a most recent speed limit.

Figure 7:
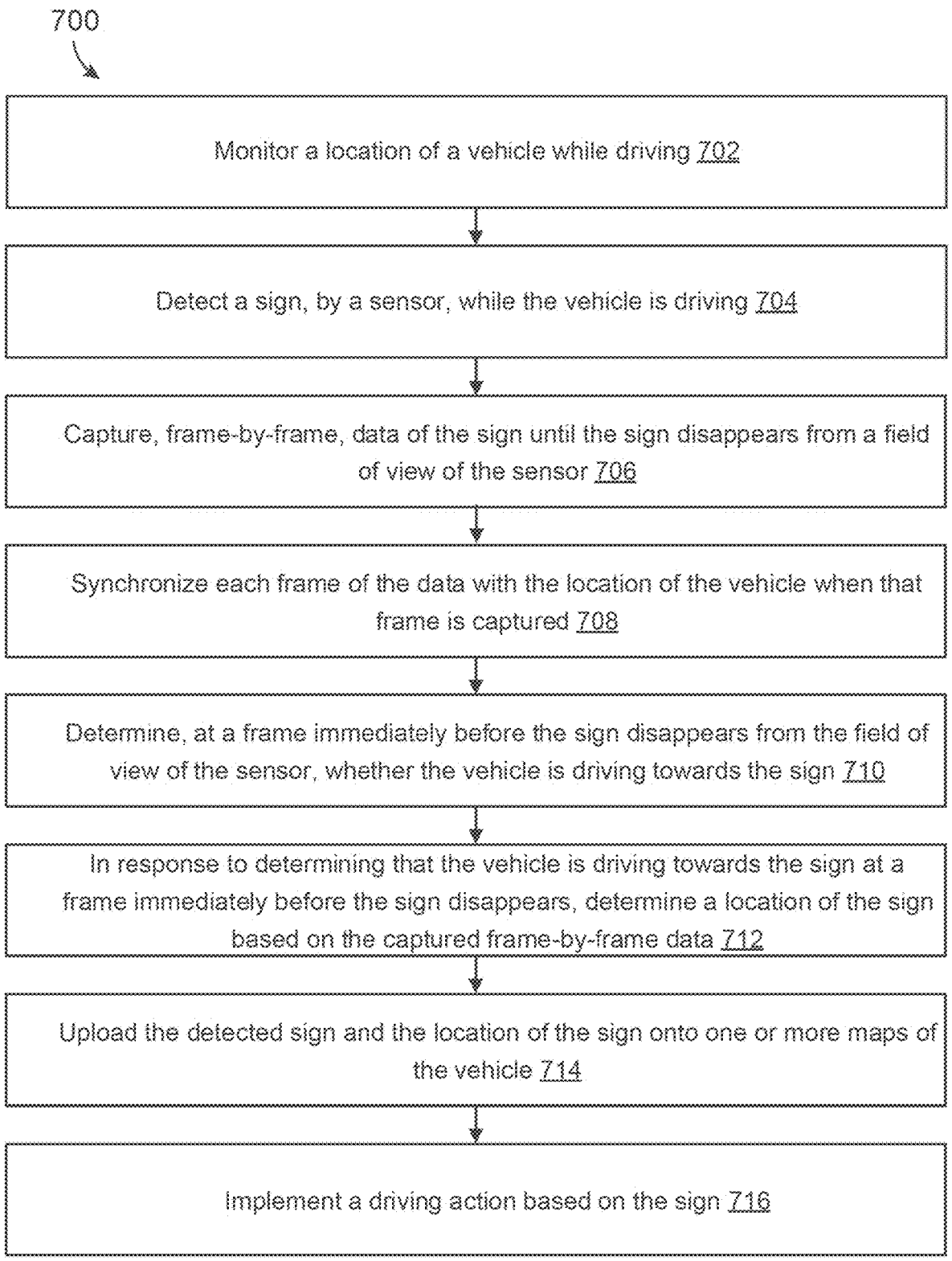
FIG. 7 illustrates a flowchart of an example of a method according to some embodiments of the present disclosure.

FIG. 7 illustrates a flowchart of a method according to some embodiments. In this and other flowcharts, the flowchart 700 illustrates by way of example a sequence of steps. It should be understood the steps may be reorganized for parallel execution, or reordered, as applicable. Moreover, some steps that could have been included may have been removed to avoid providing too much information for the sake of clarity and some steps that were included could be removed, but may have been included for the sake of illustrative clarity. The description from other FIGS. may also be applicable to FIG. 7.

In step 702, one or more processors may monitoring a location of a vehicle while driving. In step 704, the one or more processors may detect a sign, such as a road sign or a traffic sign, by a sensor, while the vehicle is driving. In step 706, the one or more processors may capture, frame-by-frame, data of the sign until the sign disappears from a field of view of the sensor. In step 708, the one or more processors may synchronize each frame of the data with the location of the vehicle. In step 710, the one or more processors may determine, at a frame immediately before the sign disappears from the field of view of the sensor, whether the vehicle is driving towards the sign. In step 712, in response to determining that the vehicle is driving towards the sign at a frame immediately before the sign disappears, the one or more processors may determine a location of the sign based on the captured frame-by-frame data. In step 714, the one or more processors may upload the detected sign and the location of the sign onto the one or more maps. In step 716, the one or more processors may implement a driving action based on the sign.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 8:
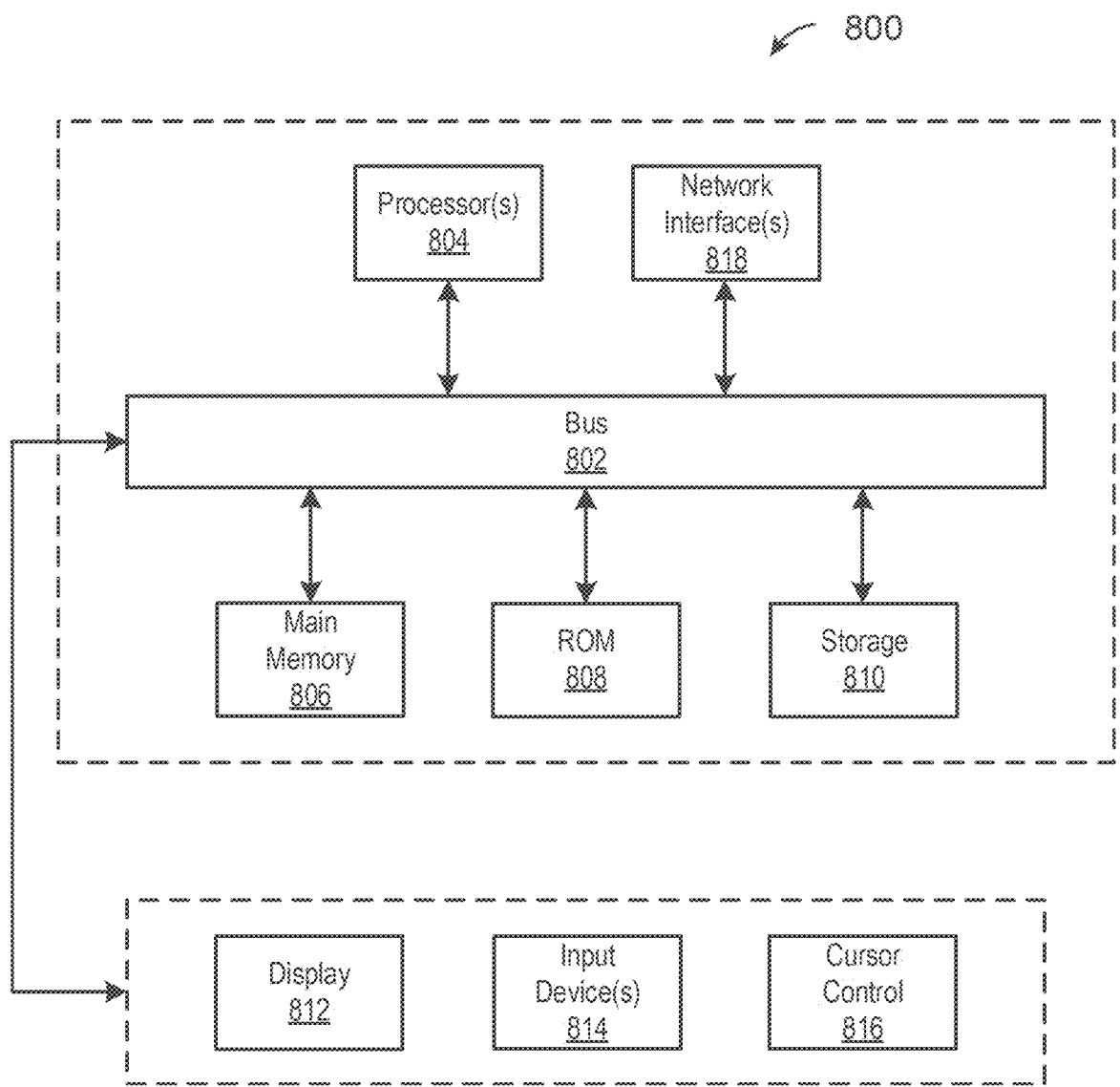
FIG. 8 is a diagram of an example computer system for implementing the features disclosed herein.

FIG. 8 is a block diagram that illustrates a computer system 800 upon which any of the embodiments described herein may be implemented. The computer system 800 includes a bus 802 or other communication mechanism for communicating information, one or more hardware processors 804 coupled with bus 802 for processing information. Hardware processor(s) 804 may be, for example, one or more general purpose microprocessors.

The computer system 800 also includes a main memory 806, such as a random access memory (RAM), cache and/or other dynamic storage devices, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions.

The computer system 800 further includes a read only memory (ROM) 808 or other static storage device coupled to bus 802 for storing static information and instructions for processor 804. A storage device 810, such as a magnetic disk, optical disk, or USB thumb drive (Flash drive), etc., is provided and coupled to bus 802 for storing information and instructions.

The computer system 800 may be coupled via bus 802 to output device(s) 812, such as a cathode ray tube (CRT) or LCD display (or touch screen), for displaying information to a computer user. Input device(s) 814, including alphanumeric and other keys, are coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 800 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor(s) 804 executing one or more sequences of one or more instructions contained in main memory 806. Such instructions may be read into main memory 806 from another storage medium, such as storage device 810. Execution of the sequences of instructions contained in main memory 806 causes processor(s) 804 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 810. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid-state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may retrieves and executes the instructions. The instructions received by main memory 806 may optionally be stored on storage device 810 either before or after execution by processor 804.

The computer system 800 also includes a communication interface 818 coupled to bus 802. Communication interface 818 provides a two-way data communication coupling to one or more network links that are connected to one or more local networks. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN (or WAN component to communicated with a WAN). Wireless links may also be implemented. In any such implementation, communication interface 818 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 818, which carry the digital data to and from computer system 800, are example forms of transmission media.

The computer system 800 can send messages and receive data, including program code, through the network(s), network link and communication interface 818. In the Internet example, a server might transmit a requested code for an application program through the Internet, the ISP, the local network and the communication interface 818.

The received code may be executed by processor 804 as it is received, and/or stored in storage device 810, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

For example, "is to be" could mean, "should be," "needs to be," "is required to be," or "is desired to be," in some embodiments.

In the following description, certain specific details are set forth in order to provide a thorough understanding of various embodiments of the invention. However, one skilled in the art will understand that the invention may be practiced without these details. Moreover, while various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise. The phrases "at least one of," "at least one selected from the group of," or "at least one selected from the group consisting of," and the like are to be interpreted in the disjunctive (e.g., not to be interpreted as at least one of A and at least one of B).

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

Although the invention(s) have been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The foregoing description of the present invention(s) have been provided for the purposes of illustration and description. It is not intended to be exhaustive or to limit the invention to the precise forms disclosed. The breadth and scope of the present invention should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

The invention claimed is:

1. A system of a vehicle comprising:
one or more sensors;
one or more processors;
one or more maps; and
a memory storing instructions that, when executed by the one or more processors, causes the system to perform:
monitoring a location of the vehicle while driving;
detecting a sign, by a sensor of the one or more sensors, while the vehicle is driving;
capturing, frame-by-frame, data of the sign until the sign disappears from a field of view of the sensor;
synchronizing each frame of the data with the location of the vehicle;
determining, at a frame immediately before the sign disappears from the field of view of the sensor, whether the vehicle is driving towards the sign, wherein the determining, at a frame immediately before the sign disappears from the field of view of the sensor, whether the vehicle is driving towards the sign, comprises:
determining a change in a position of the sign between each frame, with respect to the field of view of the sensor;
determining whether a rate of the determined change in the position of the sign, with respect to a change of the location of the vehicle, is within a range, as the sign disappears from the field of view of the sensor, wherein the rate of the determined change in the position of the sign indicates a change in the position of the sign between each frame, and following a given distance traversed by the vehicle, with respect to the field of view of the sensor;
in response to determining that the rate of the determined change in the position of the sign is within the range, determining that the vehicle is driving towards the sign; and
in response to determining that the rate of the determined change in the position of the sign is outside of the range, determining that the vehicle is driving to a side with respect to the sign;
in response to determining that the vehicle is driving towards the sign at a frame immediately before the sign disappears:
determining a location of the sign based on the captured frame-by-frame data;
uploading the detected sign and the location of the sign onto the one or more maps; and
implementing a driving action based on the sign; and
in response to determining that the vehicle is driving to a side with respect to the sign at the frame immediately before the sign disappears, disregarding the sign.

2. The system of claim 1, wherein the determining a location of the sign comprises determining the location of the sign to correspond to the location of the vehicle immediately before the sign disappears from the field of view of the sensor, in response to determining that the vehicle is driving towards the sign at a frame immediately before the sign disappears.

3. The system of claim 1, wherein:
the detecting a sign comprises detecting a change in the sign; and
the implementing a driving action comprises changing the driving action to conform to the change in the sign.

4. The system of claim 3, wherein:
the sign indicates a speed limit;
the detecting a change in the sign comprises detecting a change in the speed limit to an updated speed limit; and
the implementing a driving action comprises adjusting a speed of the vehicle based on a speed of another vehicle within a predetermined distance of the vehicle and adjusting the speed of the vehicle to be no more than the updated speed limit in response to the speed of the vehicle being higher than the updated speed limit.

5. The system of claim 1, wherein the position of the sign is a position of a center of the sign.

6. The system of claim 1, wherein the determining, at the frame immediately before the sign disappears from the field of view of the sensor, whether the vehicle is driving towards the sign, comprises:
determining a trajectory of a change in the position of the sign between each frame, with respect to the field of view of the sensor, as the sign disappears from the field of view of the sensor; and
determining whether the trajectory conforms to a predetermined trajectory.

7. The system of claim 1, wherein the instructions further cause the system to perform:
providing the location of the sign to another vehicle in order to upload the detected sign and the location of the sign onto one or more maps of the another vehicle.

8. The system of claim 1, wherein the instructions further cause the system to perform:
inputting, from another vehicle, information of a location of a sign not on the one or more maps; and
uploading the location of the sign onto the one or more maps.

9. The system of claim 1, wherein the determining, at a frame immediately before the sign disappears from the field of view of the sensor, whether the vehicle is driving towards the sign comprises:
determining, at the frame immediately before the sign disappears from the field of view of the sensor, whether an amount of space occupied by the sign within the frame is within a predetermined range.

10. The system of claim 1, wherein the detecting of a sign comprises region segmentation, edge tracing, geometrical analysis, recognition of one or more candidate regions, and model matching, wherein:
the region segmentation comprises recognizing signs under different illumination conditions, detecting any damage in a potential sign, and removing of any portions of regions unlikely to belong to the potential sign;

the edge tracing comprises recognizing that an outer edge may correspond to a known shape and recognizing that the potential sign has a particular length ratio or a particular angle between sides;

the geometrical analysis comprises recreating a shape of the potential sign, detecting a potential type of the potential sign based on the recreated shape and detected color combinations within an interior of the shape, and converting the recreated shape into a bounding box and classifying the recreated shape into a particular class; and the model matching is based on pixel count ratios for each color within regions of potential road signs.

11. The system of claim 1, wherein the determining is based on a degree of linearity in an increase in a relative position of the sign.

12. A method implemented by a computing system including one or more processors and storage media storing machine-readable instructions, wherein the method is performed using the one or more processors, the method comprising:

monitoring a location of the vehicle while driving;

detecting a sign, by a sensor of the one or more sensors, while the vehicle is driving;

capturing, frame-by-frame, data of the sign until the sign disappears from a field of view of the sensor;

synchronizing each frame of the data with the location of the vehicle;

determining, at a frame immediately before the sign disappears from the field of view of the sensor, whether the vehicle is driving towards the sign, wherein the determining, at a frame immediately before the sign disappears from the field of view of the sensor, whether the vehicle is driving towards the sign, comprises:

determining a change in a position of the sign between each frame, with respect to the field of view of the sensor;

determining whether a rate of the determined change in the position of the sign, with respect to a change of the location of the vehicle, is within a range, as the sign disappears from the field of view of the sensor, wherein the rate of the determined change in the position of the sign indicates a change in the position of the sign between each frame, and following a given distance traversed by the vehicle, with respect to the field of view of the sensor;

in response to determining that the rate of the determined change in the position of the sign is within the range, determining that the vehicle is driving towards the sign; and in response to determining that the rate of the determined change in the position of the sign is outside of the range, determining that the vehicle is driving to a side with respect to the sign;

in response to determining that the vehicle is driving towards the sign at a frame immediately before the sign disappears:

uploading the detected sign and the location of the sign onto the one or more maps; and implementing, at the location of the sign, a driving action based on the sign; and in response to determining that the vehicle is driving to a side with respect to the sign at the frame immediately before the sign disappears, disregarding the sign.

13. The method of claim 12, wherein the determining a location of the sign comprises determining the location of the sign to correspond to the location of the vehicle immediately before the sign disappears from the field of view of the sensor, in response to determining that the vehicle is driving towards the sign at a frame immediately before the sign disappears.

14. The method of claim 12, wherein:

the detecting a sign comprises detecting a change in the sign; and the implementing a driving action comprises changing the driving action to conform to the change in the sign.

15. The method of claim 14, wherein:

the sign indicates a speed limit;

the detecting a change in the sign comprises detecting a change in the speed limit to an updated speed limit; and the implementing a driving action comprises adjusting a speed of the vehicle based on a speed of another vehicle within a predetermined distance of the vehicle and adjusting the speed of the vehicle to be no more than the updated speed limit in response to the speed of the vehicle being higher than the updated speed limit.

16. The method of claim 12, wherein the position of the sign is a position of a center of the sign.

17. The method of claim 12, wherein the determining, at the frame immediately before the sign disappears from the field of view of the sensor, whether the vehicle is driving towards the sign, comprises:

determining a trajectory of a change in the position of the sign between each frame, with respect to the field of view of the sensor, as the sign disappears from the field of view of the sensor; and determining whether the trajectory conforms to a predetermined trajectory.

18. The method of claim 12, further comprising:

providing the location of the sign to another vehicle in order to upload the detected sign and the location of the sign onto one or more maps of the another vehicle.

19. The method of claim 12, further comprising:

inputting, from another vehicle, information of a location of another sign not on the one or more maps; and uploading the location of the sign onto the one or more maps.

20. The method of claim 12, wherein the determining, at a frame immediately before the sign disappears from the field of view of the sensor, whether the vehicle is driving towards the sign comprises:

determining, at the frame immediately before the sign disappears from the field of view of the sensor, whether an amount of space occupied by the sign within the frame is within a predetermined range.

* * * * *